United States Patent [19]

Miller

[11] 4,149,759

[45] Apr. 17, 1979

[54] RADIAL BEARING ARRANGEMENT

[75] Inventor: Helmut Miller, Niederrohrdorf, Switzerland

[73] Assignee: Escher Wyss Limited, Zurich, Switzerland

[21] Appl. No.: 744,254

[22] Filed: Nov. 23, 1976

[30] Foreign Application Priority Data

Dec. 2, 1975 [CH] Switzerland ................. 15610/75

[51] Int. Cl.$^2$ .................... F16C 32/06; F16C 27/00
[52] U.S. Cl. ............................ 308/15; 308/9; 308/73
[58] Field of Search ............ 308/9, 73, 122, 15, 308/160; 415/107, 110, 172 R, 142, 133; 417/424

[56] References Cited

U.S. PATENT DOCUMENTS

| | | | |
|---|---|---|---|
| 1,117,504 | 11/1914 | Kingsbury | 308/160 |
| 2,134,621 | 10/1938 | Pesarese | 308/73 X |
| 3,258,300 | 6/1966 | Saunders | 308/73 |
| 3,398,996 | 8/1968 | Wucherer | 308/9 X |
| 3,675,977 | 7/1972 | Arsenius et al. | 308/9 |
| 3,711,169 | 1/1973 | Gardner | 308/73 |
| 3,791,703 | 2/1974 | Ifield | 308/73 X |
| 3,910,650 | 10/1975 | Kraus | 308/9 |

Primary Examiner—Robert J. Spar
Assistant Examiner—Edward M. Wacyra
Attorney, Agent, or Firm—Robert A. Ostmann

[57] ABSTRACT

The disclosure concerns a radial bearing arrangement for a large diameter rotor wherein the rotor carries an annular surface in a peripheral region spaced radially from the axis which cooperates with a series of bearing devices mounted in a foundation. The bearing devices provide reactions in a limited number of main supporting directions and act collectively to restrain the rotor against movement in all radial directions. Not more than two of the bearing devices provide positive, non-yielding restraint in those main directions, whereas the other bearing devices have radially displaceable bearing shoes and furnish yielding holding forces. The arrangement may include one type of yielding bearing device which furnishes a reaction which varies with displacement and affords a centering action, and/or a second type which furnishes a constant reaction during slow displacements and an increased reaction during rapid displacement, and thus affords damping action. In cases where the rotor axis is not vertical, a type of bearing device, which affords a constant reaction regardless of displacement, may be employed to carry the weight of the rotor.

15 Claims, 12 Drawing Figures

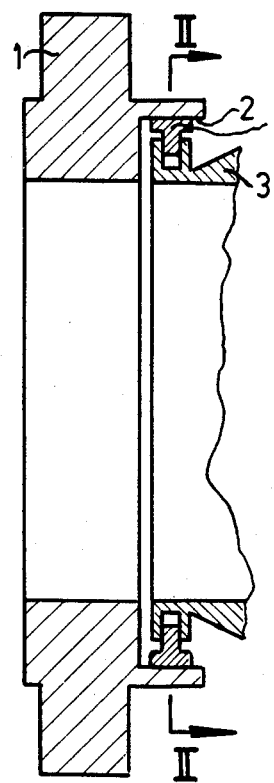
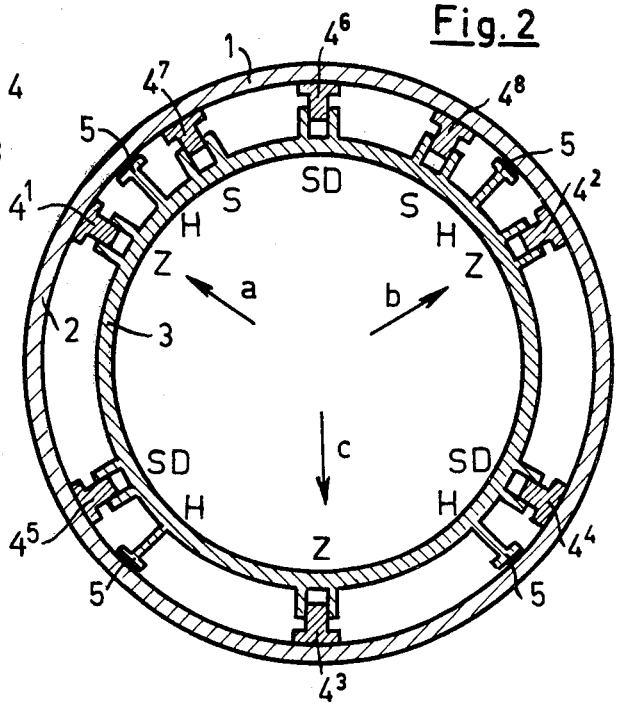
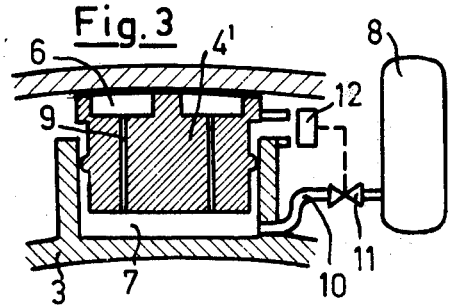
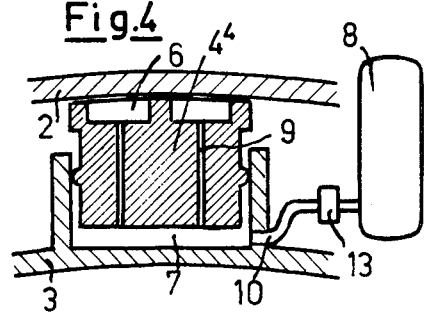
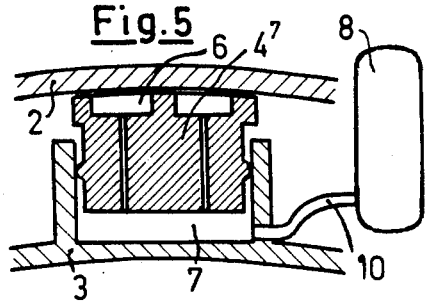
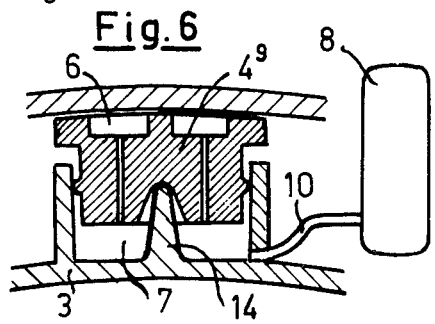

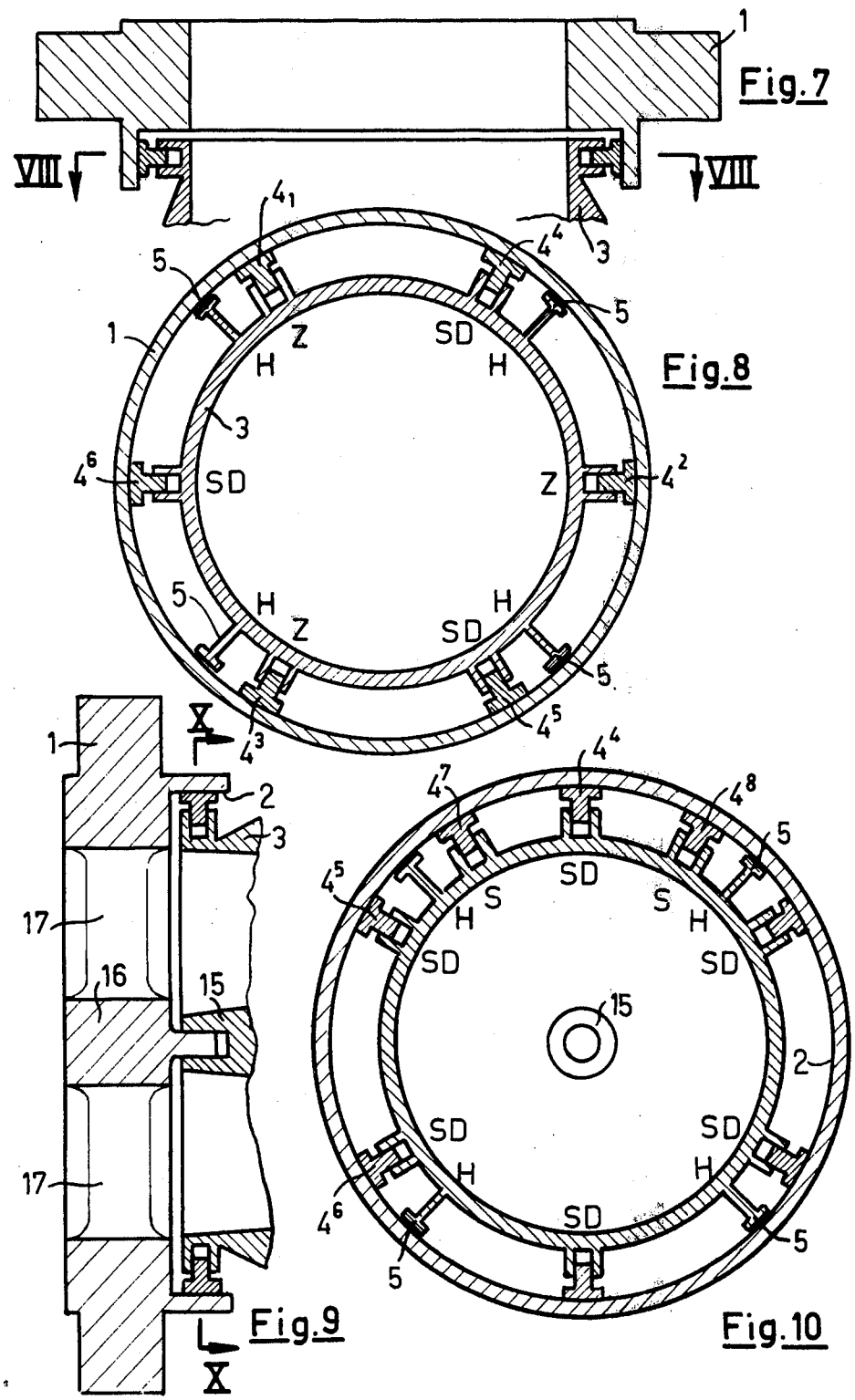

RADIAL BEARING ARRANGEMENT

BACKGROUND OF THE INVENTION

This invention relates to a radial bearing arrangement for a rotor or large diameter.

German published specification No. 2,049,402 discloses a hydrostatic bearing arrangement for a comminuting drum in which the drum is supported on a foundation by means of hollow journals carried by its end walls. The journals bear on four bearing shoes which are arranged in succession to one another in the circumferential direction and are situated in the lower quarter of the hollow journals. Radial displacement of each bearing shoe is controlled by a servo motor, and the motors at each side of the vertical center plane are interconnected by a pressure conduit so as to obtain an equilibrium of the bearing reactions of supporting forces. The intent is to load all four bearing shoes in as uniform a manner as possible. This radial bearing arrangement is suitable only for rotors which run at a low rotational speed and which impose on the support substantially only gravitational forces.

German Pat. No. 1,628,103 discloses a radial bearing arrangement for the rapidly rotating rotor of a hydraulic tube-type turbine, wherein the rotor includes in its peripheral region an annular surface which cooperates with rollers supported on the foundation. In the lower quarter of the bearing arrangement, there are situated rollers which are carried in a chain system and which sustain the weight of the rotor. At each side of the rotor, there is situated a guide roller which is positioned above the horizontal plane containing the rotor axis, and which is connected securely with the foundation. This bearing arrangement is suitable only for relatively small rotors because it supports the rotor rigidly.

SUMMARY OF THE INVENTION

The object of the present invention is to provide a radial bearing arrangement wherein the rotor is supported radially in all directions in a satisfactory manner, and yet can expand or contract in diameter under thermal stress or under varying centrifugal forces, and wherein the axis of the rotor can be held so as to be non-displaceable relatively to the foundation.

According to the invention, the rotor is provided with an annular surface in a peripheral region spaced radially from the axis which cooperates with the bearing shoes of a plurality of circumferentially spaced bearing means mounted in the foundation. The bearing means provide reactions in a limited number of main supporting directions which are chosen so that the rotor is restrained against movement relatively to the foundation in all radial directions. A key feature of the new arrangement is that not more than two of the bearing means afford positive, non-yielding restraint in the main supporting directions, whereas the other bearing means have radially displaceable shoes and furnish yielding holding forces.

The main supporting directions are, of course, those supporting directions which are absolutely necessary for holding the rotor perfectly in position. In the simplest case, three main supporting directions are required, and the angle between two adjacent supporting directions advantageously is 120°, but, in actual practice, it may be selected from the range between 80° and 140°. Commonly, however, four main supporting directions are provided. In this case, the directions are spaced apart by 90°, so the rotor is supported from below, from above and from both sides.

For various reasons, it is desirable to include in the bearing arrangement one or several different types of yielding bearing means. For example, in order to center the rotor relatively to the foundation, the arrangement uses one or more bearing means constructed to increase the reaction provided by the associated shoe when the latter is displaced in a direction opposite to its supporting direction, and to decrease the reaction upon displacement in the reverse sense. In cases where the rotor is subjected to radial shocks, the arrangement includes one or more bearing constructed to afford damping action. In other words, these bearing means cause the associated shoe to provide a constant reaction during slow displacements, and to provide an increased reaction when there is a rapid displacement in the direction opposite to the supporting direction. Finally, in situations where the rotor axis is not vertical, the arrangement may include one or several bearing means which furnish a constant reaction regardless of displacement, and which are arranged to sustain at least a portion of the weight of the rotor.

Since the new bearing arrangement provides bearing reactions at least in the main supporting directions, and limits the use of positive, non-yielding restraint to no more than two of those directions, it insures satisfactory radial support for the rotor, yet allows the rotor to expand and contract substantially unhindered.

BRIEF DESCRIPTION OF THE DRAWINGS

Several embodiments of the invention are described herein in detail with reference to the accompanying drawings, which contain simplified schematic illustrations, and in which:

FIG. 1 is a vertical axial sectional view through the ring-shaped rotor of the first embodiment.

FIG. 2 is a sectional view taken on the line II—II if FIG. 1.

FIGS. 3 to 6 are enlarged sectional views of the various types of bearing means employed in the embodiment of FIGS. 1 and 2.

FIG. 7 is a vertical, axial sectional view through the ring-shaped rotor of a second embodiment.

FIG. 8 is a sectional view taken on the line VIII—VIII of FIG. 7.

FIG. 9 is a vertical, axial sectional view through the wheel-type rotor of a third embodiment.

FIG. 10 is a sectional view taken on the line X—X of FIG. 9.

DESCRIPTION OF ILLUSTRATED EMBODIMENTS

Figure 11:
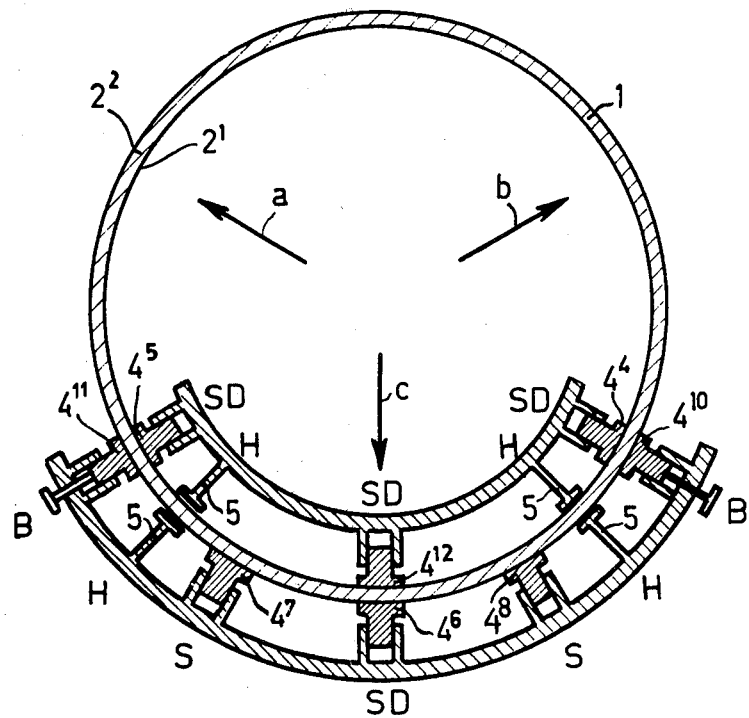
FIG. 11 is a transverse sectional view, analogous to those in FIGS. 2, 8 and 10, for a further embodiment.

The radial bearing arrangement shown in FIG. 1 to FIG. 5 is used for supporting a large diameter rotor 1, which includes an annular surface 2 which is located in its peripheral region and is coaxial with the rotor axis. Surface 2 cooperates with bearing shoes 4 which are mounted in a foundation 3 and by means of which the rotor 1 bears on the foundation. The rotor 1 is radially supported on the foundation 3 in three main supporting directions a, b, c which are indicated by arrows. All of the bearing shoes 4 in this embodiment are capable of radial displacement relatively to the foundation 3.

The bearing shoes $4^1$, $4^2$ and $4^3$ are used only for centering rotor 1 relatively to foundation 3. Each of these bearing shoes $4^1$, $4^2$, $4^3$ furnishes a bearing reaction which increases in the event it is displaced in a direction opposite to its supporting direction, and which decreases with displacement in the reverse sense. The force-travel characteristic of the centering bearing shoes is selected so that when the rotor 1 expands the supporting forces or bearing reactions are just sufficient for centering, and when the rotor 1 shrinks the bearing reaction does not cause any unallowable deformation of the rotor.

The bearing arrangement also includes three bearing shoes $4^4$, $4^5$ and $4^6$, each of which is diametrically opposite one of the centering bearing shoes $4^1$, $4^2$ or $4^3$. Each of these bearing shoes $4^4$, $4^5$ and $4^6$ serves as a floating damping shoe, which furnishes a constant reaction force when it is displaced slowly, but provides an increased reaction when it is displaced suddenly in the direction opposite to its supporting direction. Thus, these floating damping shoes follow expansion and contraction of annular surface 2 without varying their reaction forces. However, if radial impacts occur, the reaction force of the bearing shoes $4^4$, $4^5$, $4^6$ increases greatly, so that bearing shoes, at the instant of impact, behave as radially non-displaceable bearing shoes and prevent displacement of rotor 1.

If the bearing reactions of floating damping shoes $4^4$, $4^5$, $4^6$, which occur in the floating state, are selected so that they are equal to the mean bearing reaction of the centering bearing shoes $4^1$, $4^2$, $4^3$, the bearing shoes $4^1$ to $4^6$ exert on rotor 1 equal supporting forces which are distributed uniformly in the circumferential direction.

The rotor in the FIG. 1 embodiment has a horizontal axis. Accordingly, to sustain the rotor weight, the bearing arrangement includes two bearing shoes $4^7$ and $4^8$ which produce oblique, upwardly directed bearing reactions. Each of these two bearing shoes is constructed as a floating bearing shoe which affords a constant bearing reaction regardless of its displacement. Because the floating shoes $4^7$ and $4^8$ carry the entire weight of rotor 1, the rotor 1 floats in space, in a sense, and the centering bearing shoes and the floating damping shoes simply have to center and damp the rotor, respectively.

The improved bearing arrangement also provides, in each of four main supporting directions, an auxiliary bearing 5 which is mounted securely on foundation 3 and is situated outside the range of radial movement of annular surface 2 which is possible during normal operation because of the displaceable nature of bearing shoes $4^1$ to $4^8$. These auxiliary bearings 5 take over the task of emergency support of rotor 1 in the event of incorrect yielding of the displaceable bearing shoes $4^1$ to $4^8$.

In the interests of clarity, FIG. 2 of the drawings uses letters to designate the various types of bearing means. Thus, the centering bearing shoes are indicated at Z, the floating damping shoes at SD, the floating bearing shoes at S, and the auxiliary bearings at H.

The construction of the various types of bearing shoes used are shown in FIGS. 3 to 5. In each case, the bearing shoe 4 comprises pockets 6 for lubricant which are directed and open towards the annular surface 2, and the shoe is mounted in the foundation 3 by means of a hydraulic adjusting motor 7. The lower end of the bearing shoe 4 forms the piston of the adjusting motor 7 and is mounted pivotably in the cylinder of the adjusting motor 7. The pressure chamber of the adjusting motor 7 is connected with a source 8 of pressure medium and also, via a throttled conduit 9, with each of the pockets 6 of the bearing shoe 4. Thus, the pressure medium of the motor is used as lubricant for the radial bearing arrangement.

In the case of the centering bearing shoes, one of which is shown in FIG. 3, the conduit 10 leading from the pressure medium source 8 into the pressure chamber of the adjusting motor 7 contains a throttle valve 11 which is operated by an adjusting device 12. The adjusting device 12 measures the spacing of the bearing shoe $4^1$ from the cylinder of the adjusting motor 7 radially with respect to the axis of the rotor 1 and adjusts throttle valve 11 so that the pressure in the pressure chamber of the adjusting motor increases when the aforesaid radial spacing decreases, and the pressure in the pressure chamber of the adjusting motor drops when the aforesaid radial spacing increases.

Two further constructional examples of centering bearing shoes are described in detail in U.S. Application Ser. No. 744,252 filed concurrently herewith, and in U.S. Pat. No. 3,994,367 issued Nov. 30, 1976.

In the case of the floating damping bearing shoes, one of which is shown in FIG. 4, the conduit 10 leading from the pressure medium source 8 into the pressure chamber of the adjusting motor 7 contains a fixed throttling device 13. This throttling device is dimensioned so that the quantity of pressure medium which always flows from the pockets 6 of the bearing shoe $4^4$ through the gap between the bearing shoe and the annular surface 2 into the surrounding area can be replaced by an inflow from the pressure medium source 8. This inflow can increase and decrease as needed to accommodate slow movements of the bearing shoe corresponding to contraction and expansion of the rotor. However, if there are rapid movements of the bearing shoe towards the pressure chamber of the adjusting motor 7, the return flow of pressure medium from the pressure chamber to source 8 is restricted by device 13 to such an extent that a sudden pressure rise takes place in the pressure chamber. As a result, the bearing reaction of the shoe is multiplied. As an alternative, throttling device 13 may be a non-return valve which prevents completely return flow of pressure medium to the source 8.

A further constructional example of a floating damping bearing shoe is described in detail in U.S. Application Ser. No. 744,319 filed concurrently herewith.

As indicated in FIG. 5, the adjusting motor 7 of each of the floating bearing shoes $4^7$ and $4^8$ is in free communication with pressure medium source 8 through conduit 10. Source 8 supplies pressure medium at a constant pressure, so a constant pressure prevails in the pressure chamber of the adjusting motor 7 regardless of displacement of the bearing shoe. The pressure level in that chamber is so selected that the two floating bearing shoes $4^7$ and $4^8$ furnish reactions which together are just sufficient for carrying the weight of rotor 1.

A constructional example of a floating bearing shoe of this kind is described in detail in the U.S. Pat. No. 3,802,044, granted Apr. 9, 1974.

If small displacements of the axis of rotor 1 can be tolerated, the centering bearing shoes $4^1$ and $4^2$ which act in main supporting directions a and b may be replaced by bearing shoes which perform a shape-holding function, i.e., which afford a positive, unyielding reaction. A bearing shoe of this kind is shown in FIG. 6. It comprises a bearing shoe $4^9$ which is supported pivotably on a fixed supporting base 14 which is arranged in the pressure chamber of the adjusting motor 7 and supplies a part of the bearing reaction. Accordingly, in this bearing means, the ratio of the piston surface of the adjusting motor 7 to the end face of the bearing shoe is smaller. Apart from this, the bearing shoe of FIG. 6 corresponds to a floating bearing shoe of FIG. 5, which has already been described.

In the radial bearing arrangement shown in FIGS. 7 and 8, rotor 1 has a vertical axis, so the bearing shoes are not loaded by the weight of the rotor. Accordingly, the arrangement uses only the centering bearing shoes $4^1$, $4^2$, and $4^3$, which are arranged in three main supporting directions, and the diametrically opposed floating damping bearing shoes $4^4$ to $4^6$ for normal operation. All of these bearing shoes $4^1$ to $4^6$ are capable of radial displacement relatively to the foundation. For the sake of safety, however, the arrangement also includes the set of auxiliary bearings 5 employed in the first embodiment.

In the embodiment of FIGS. 9 and 10, shoes 4 are again capable of radial displacement relatively to the foundation, but the center of rotor 1 is mounted to be non-displaceable in all radial directions by means of a radial bearing 15 of small diameter. This radial bearing 15 supports the journal of a hub 16 which is connected to the rotor rim by means of spokes 17. In place of the sets of centering and floating damping shoes used in the earlier embodiments, this bearing arrangement employs a series of six floating damping shoes which are distributed in a uniform manner around the circumference of annular surface 2. Three of these shoes are designated at $4^4$, $4^5$ and $4^6$. As in the FIG. 1 embodiment, two floating bearing shoes $4^7$ and $4^8$ carry the weight of the rotor, and a set of auxiliary bearings 5 is included as a safety measure.

The radial bearing arrangement illustrated in FIG. 11 employs a rotor 1 having two annular surfaces $2^1$ and $2^2$ which are coaxial with the axis and cooperate with the bearing shoes 4. One annular surface $2^1$ faces radially inward, and the other annular surface $2^2$ faces radially outward. This arrangement makes it possible to achieve satisfactory radial support using bearing shoes 4 which are confined to one-third of the circumference of the rotor. In this scheme, rotor 1 is centered by a pair of base bearing shoes $4^{10}$ and $4^{11}$ which coact with surface $2^2$ and are situated in main supporting directions a and b, respectively, and by a floating damping shoe $4^{12}$ which coacts with surface $2^1$ and is situated in main supporting direction c. Opposite reactions in the three main supporting directions are furnished by floating damping bearing shoes $4^4$, $4^5$ and $4^6$, the first two of which cooperate with surface $2^1$, and the third of which cooperates with surface $2^2$. The weight of rotor 1 is carried by floating bearing shoes $4^7$ and $4^8$, which cooperate with annular surface $2^2$.

Figure 12:
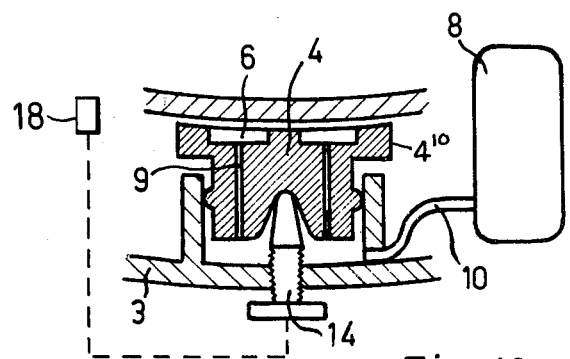
FIG. 12 is an enlarged sectional view through one of the bearing means employed in the embodiment of FIG. 11.

As shown in FIG. 12, each of the two base bearing shoes $4^{10}$ and $4^{11}$ has an adjustable supporting base 14 which is adapted to be moved away from the axis of the rotor when the rotor expands and towards the axis of the rotor when the rotor contracts. As a result, the position of the axis of the rotor remains unaltered. Adjustment of the bases 14 may be accomplished by a control device (indicated schematically at 18) which measures either the diameter of rotor 1, or the spacing between the annular surface $2^1$ (or $2^2$) and the foundation at diametrically opposite locations, and which moves the supporting bases 14 in the sense and as needed to enable the bearing shoes to hold the axis of the rotor 1 in a neutral position.

In all of the illustrated embodiments, the bearing shoes $4^1$ to $4^8$, which furnish yielding reaction forces, are mounted on foundation 3 solely by hydraulic adjusting motors 7 which are connected to a pressure medium source 8. However, bearing shoes affording such reactions may be mounted using another kind of device, which may include rigid elements.

I claim:

1. A radial bearing arrangement for supporting a large diameter rotor on a foundation, the arrangement comprising
    a. an annular surface carried by the rotor in a peripheral region spaced radially from the rotor axis and coaxial with that axis; and
    b. at least three circumferentially spaced bearing means mounted in the foundation and each of which includes a radially arranged bearing shoe having a face adjacent said annular surface containing at least one bearing pocket which opens toward said surface, and means for feeding lubricant to the pocket,
    c. the bearing means providing reactions in main supporting directions so selected that the bearing means act collectively to restrain the rotor against movement relatively to the foundation in all radial directions,
    d. two of said bearing means serving to center the rotor with respect to the foundation, and each of the remaining bearing means furnishing a yielding holding force and including a bearing shoe which is radially displaceable relatively to the foundation, and a hydraulic adjusting motor for positioning said shoe,
    e. whereby the arrangement supports the rotor in all radial directions while accommodating expansion and contraction of the rotor.

2. A radial bearing arrangement as defined in claim 1 in which each of said bearing means which serve to center the rotor includes reaction-changing means for increasing the bearing reaction as the associated shoe is displaced in a direction opposite to its supporting direction and for decreasing the bearing reaction as the shoe is displaced in the supporting direction.

3. A radial bearing arrangement as defined in claim 1 in which at least one of said remaining bearing means includes reaction-changing means for causing the associated shoe to supply a constant reaction during slow displacements and for increasing the reaction upon the occurrence of rapid displacement in a direction opposite to its supporting direction, whereby the bearing means acts as a damping device.

4. A radial bearing arrangement as defined in claim 3 in which
    a. there are three bearing means, each providing a reaction in one of three main supporting directions;
    b. two of said bearing means serve to center the rotor and afford positive, non-yielding restraint; and
    c. the third bearing means includes said reaction-changing means and acts as a damping device.

5. A radial bearing arrangement as defined in claim 4 in which the bearing shoe of each of the two bearing means which afford positive, non-yielding restraint is seated on a base which is mounted on the foundation for adjustment in the radial direction; and which includes a control device for adjusting the base so as to move the shoe toward the rotor axis when the rotor contracts and away from that axis when the rotor expands, whereby the position of the rotor axis in space remains unaltered.

6. A radial bearing arrangement as defined in claim 1 in which at least one of said remaining bearing means includes a floating shoe which supplies a constant reaction regardless of its displacement.

7. A radial bearing arrangement as defined in claim 1 in which
   a. all of said bearing means have bearing shoes which are radially displaceable relatively to the foundation and furnish yielding holding forces;
   b. each of said bearing means includes reaction-changing means for increasing the bearing reaction as the associated shoe is displaced in a direction opposite to its supporting direction and for decreasing the bearing reaction as the shoe is displaced in the supporting direction, whereby the bearing means act as centering devices; and
   c. which includes a set of additional bearing means which cooperate with said annular surface and provide reactions in supporting directions opposite to said main supporting directions,
   d. each additional bearing means including a radially displaceable bearing shoe, and reaction-changing means for causing the associated shoe to supply a constant reaction during slow displacements and for increasing the reaction upon the occurrence of rapid displacement in a direction opposite to its supporting direction,
   e. whereby the additional bearing means act as damping devices when the rotor is subjected to radial impacts.

8. A radial bearing arrangement as defined in claim 7 wherein the rotor has a non-vertical axis; and which includes at least one additional bearing means which has a floating bearing shoe which cooperates with said annular surface and supplies a constant reaction regardless of its displacement, the additional bearing means being positioned to sustain at least a part of the weight of the rotor.

9. A radial bearing arrangement as defined in claim 1 wherein the rotor has a non-vertical axis; and which includes at least one additional bearing means which has a floating bearing shoe which cooperates with said annular surface and supplies a constant reaction regardless of its displacement, the additional bearing means being positioned to sustain at least a part of the weight of the rotor.

10. A radial bearing arrangement as defined in claim 1 in which said annular surface has two distinct portions.

11. A radial bearing arrangement as defined in claim 10 in which one of said distinct portions faces radially inward and cooperates with at least one of said bearing means, and the other distinct portion faces radially outward and cooperates with the other bearing means.

12. A radial bearing arrangement as defined in claim 1 which includes auxiliary bearings which are mounted on the foundation and, in normal operation, are spaced radially from said annular surface, the auxiliary bearings serving to cooperate with said annular surface and restrain the rotor in the event of excessive yielding of the displaceable bearing shoes.

13. A radial bearing arrangement as defined in claim 1 wherein the bearing shoes are mounted for pivotal movement on the foundation.

14. A radial bearing arrangement as defined in claim 1 in which each bearing means furnishes a yielding holding force and includes a bearing shoe which is radially displaceable relatively to the foundation and an hydraulic adjusting motor.

15. A radial bearing arrangement as defined in claim 14 in which each adjusting motor has a pressure chamber which is connected with a pressure medium source; and each of said pockets is connected with the pressure chamber of the associated adjusting motor by a throttled conduit, whereby the pressure medium serves as the lubricant.

* * * * *